United States Patent
Scofield et al.

(10) Patent No.: US 9,211,891 B2
(45) Date of Patent: Dec. 15, 2015

(54) PERSONALIZED VEHICLE DRIVING SUGGESTIONS

(71) Applicant: INRIX Inc., Kirkland, WA (US)

(72) Inventors: Christopher L. Scofield, Seattle, WA (US); Scott Marshall Sedlik, Mercer Island, WA (US)

(73) Assignee: INRIX Inc., Kirkland, WA (US)

( * ) Notice: Subject to any disclaimer, the term of this patent is extended or adjusted under 35 U.S.C. 154(b) by 180 days.

(21) Appl. No.: 13/957,552

(22) Filed: Aug. 2, 2013

(65) Prior Publication Data

US 2015/0035666 A1 Feb. 5, 2015

(51) Int. Cl.
| | |
|---|---|
| B60W 40/09 | (2012.01) |
| G07C 5/08 | (2006.01) |
| B60W 50/14 | (2012.01) |
| G01C 21/36 | (2006.01) |
| G06Q 50/30 | (2012.01) |

(52) U.S. Cl.
CPC ............... *B60W 40/09* (2013.01); *B60W 50/14* (2013.01); *G01C 21/3697* (2013.01); *G06Q 50/30* (2013.01); *G07C 5/0816* (2013.01)

(58) Field of Classification Search
CPC .... B60W 40/09; B60W 50/14; G07C 5/0816; G01C 21/3697; G06Q 50/30
USPC .......................................................... 701/123
See application file for complete search history.

(56) References Cited

U.S. PATENT DOCUMENTS

| | | | | |
|---|---|---|---|---|
| 5,483,446 | A | * | 1/1996 | Momose et al. ................... 701/1 |
| 6,667,726 | B1 | * | 12/2003 | Damiani et al. ............... 345/1.1 |
| 2004/0030458 | A1 | | 2/2004 | Entenmann |
| 2008/0120175 | A1 | | 5/2008 | Doering |
| 2009/0326753 | A1 | | 12/2009 | Chen et al. |
| 2010/0055649 | A1 | | 3/2010 | Takahashi et al. |
| 2010/0178637 | A1 | | 7/2010 | Lecointre et al. |
| 2010/0198456 | A1 | | 8/2010 | Komori et al. |
| 2011/0140874 | A1 | | 6/2011 | Tauchi et al. |
| 2012/0022904 | A1 | | 1/2012 | Mason et al. |
| 2013/0151588 | A1 | | 6/2013 | Basir |

FOREIGN PATENT DOCUMENTS

| | | |
|---|---|---|
| EP | 1328857 B1 | 12/2005 |
| WO | 0007150 A1 | 2/2000 |

OTHER PUBLICATIONS

International Search Report and Written Opinion dated Feb. 4, 2015, 14 pages.

* cited by examiner

*Primary Examiner* — Richard Camby
(74) *Attorney, Agent, or Firm* — Cooper Legal Group, LLC

(57) ABSTRACT

In many vehicular control contexts, a vehicle may monitor the vehicle input control from a driver to detect warning conditions that entail a warning to the user and/or an automatic mitigating action (e.g., detecting hard braking that causes brake lockup, and automatically activating anti-lock braking). Warning and mitigation techniques may address the instant driving conditions, but may not the user driving behavior that caused the condition (e.g., a driving style of the user that resulted in hard braking, such as excessive speed for current driving conditions). Presented herein are techniques for monitoring the user driving behavior of the user in various driving contexts, and presenting driving suggestions of alternative driving behaviors providing advantages over the current user driving behavior of the user. The presentation of the alternative driving behaviors to the user may facilitate changes in user driving behavior that improve the safety, efficiency, and/or comfort of the driving experience.

20 Claims, 8 Drawing Sheets

PERSONALIZED VEHICLE DRIVING SUGGESTIONS

BACKGROUND

Within the field of computing, many scenarios involve the detection of vehicle control input by a user while controlling a vehicle in a driving context. For example, a driver of an automobile may manipulate the gas, brake, gearshift, and steering wheel, and a device on board the automobile may monitor the vehicle control input to control the automobile according to the input from the user. The device may also evaluate the vehicle control input as a safety precaution; e.g., upon detecting a firm application of the brakes resulting in a lockup condition, the vehicle may instead activate an antilock braking system that modifies the user's vehicle control input to provide a less firm braking pattern with greater stopping power. The device may also warn the user if the vehicle control input creates a dangerous condition (e.g., in a manual transmission automobile, upon detecting acceleration into an engine speed range that is beyond the efficient range of the current gear, the automobile may advise the driver to upshift; and upon an airplane engine falling below a maintainable speed, an airplane may warn the pilot of an imminent stall and advise increasing the speed). These monitoring and user feedback techniques may assist the user in the moment-to-moment control of the vehicle.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

While it may be advantageous to monitor the current conditions of a vehicle for warning conditions and advise the user as to the immediate situation may be advantageous, such techniques may be of limited value in changing the driving behavior of the user that led to the warning conditions. As a first example, while it may be advantageous to remediate hard braking that may create a lockup scenario by activating antilock braking systems, such warnings neither inform the user of the scenario that led to the lockup scenario, such as excessive speed for the current driving context, inadequate use of headlights (e.g., failure to activate high beams or fog lamps), or inadequately maintained braking distance with respect to a leading vehicle. As a second example, an instance of improper gear selection in a manual transmission vehicle may be remediated by advising the driver to upshift or downshift, but such instructions do not address the cause of the improper gear selection (e.g., early or late shifting while accelerating or decelerating). In these scenarios, either the driver may simply not be aware of the driving behaviors that led to the warning condition and the remediating notification or action; the driver may be aware of the cause, but may not understand the alternative driving behaviors that may mitigate or avoid the warning condition; the driver may be aware of both the causal driving behaviors and the alternative driving behaviors, but may not perceive the advantages of the alternative behaviors; or the driver may simply have trouble breaking the habit of a disadvantageous driving behavior.

Presented herein are techniques for automatically assisting drivers in improving driving behaviors based on personalized suggestions. In accordance with these techniques, a device may monitor a vehicle control input of the vehicle by the user to identify driving behaviors of the user in a driving context. That is, rather than simply monitoring the control input of the vehicle and providing ameliorating actions and advice based on the control input (such as hard braking or improper gear selection), such techniques involve an identification of the user driving behaviors that motivated the input, such as the driving style of the user that led to the control input (such as excessive speed, delayed reaction, overreaction, or improper perception of driving context). The techniques also involve identifying at least one alternative driving behavior providing an advantage over the user driving behavior of the user for operating the vehicle in the driving context, and presenting a driving suggestion to the user of the alternative driving behavior. These techniques may serve to automatically identify and inform the user of changes in driving style that may provide advantages in the operation of the vehicle, such as safety, reliability, comfort, and economy of costs and resources.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
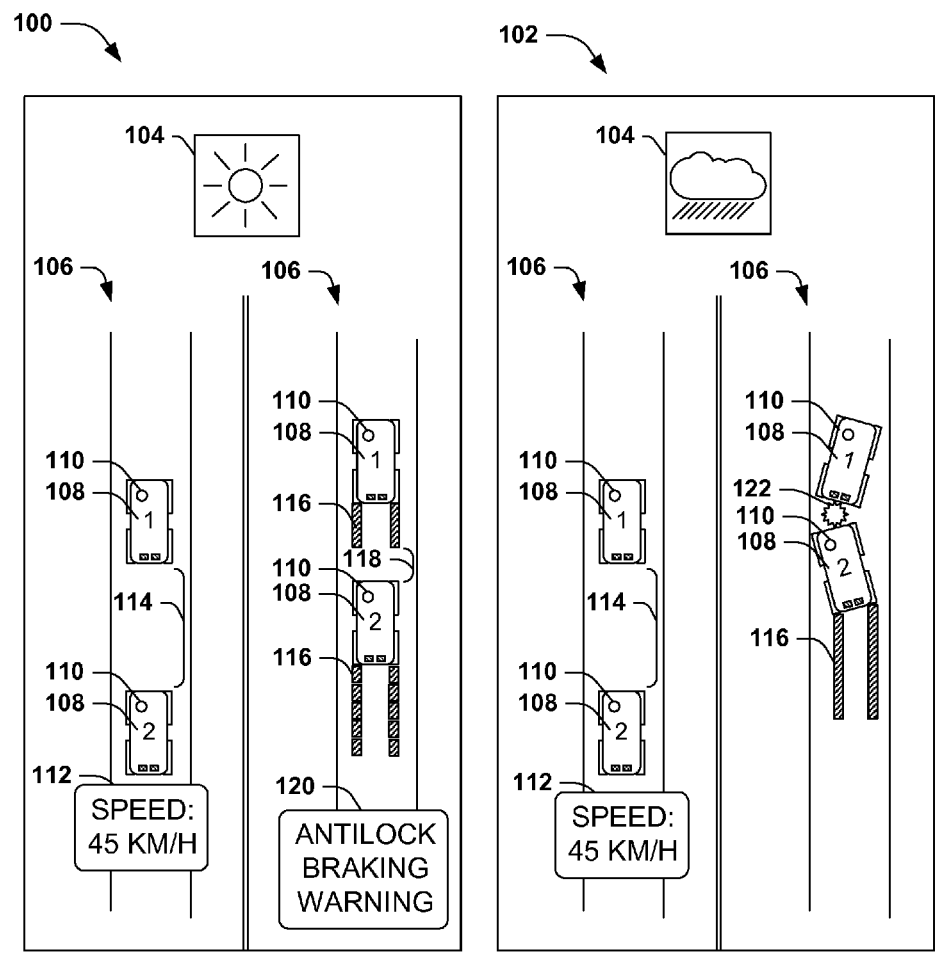
FIG. 1 is an illustration of an exemplary scenario featuring variable user driving behaviors of users in various driving contexts.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

A. Introduction

In the field of vehicles, many scenarios involve a device configured to monitor user control input provided to a vehicle. The device may utilize such input, e.g., to translate the user control input to the mechanics of the vehicle, and to achieve the intent of the user control input; to manage related operating parameters of the vehicle in response to the user control input (e.g., adjusting spark ignition timing in response to the accelerator); and recording the user control input (e.g., an odometer tracking the mileage of a vehicle).

In many such scenarios, the monitoring is utilized to evaluate the user control input of the user, and, in some cases, to alter or respond to the user control input in furtherance of conditions such as safety and efficiency. As a first such example, a device may monitor the acceleration rate of the vehicle, and upon detecting rapid acceleration that is indicative of a collision, may activate an airbag. As a second such example, antilock braking systems are designed to detect a current braking rate selected by the user, and upon detecting hard braking with a tendency to lock up the brakes (e.g., upon detecting loss of traction), the device may alter the braking rate to an intermittent pattern that provides greater stopping power than sliding induced by continuous braking. As a third such example, a hybrid gearshift may provide a mode enabling a user to select a gear, but upon detecting a selection of a gear that is not suitable for the current speed of the vehicle and engine, may restrict the selection of the selected gear or may select a more suitable gear. Such systems may also advise the user regarding the results of the current selection (e.g., that the currently selected gear may damage the vehicle, and/or advising the user to select a different gear that is more suitable to the present operation of the vehicle). These and other techniques may be utilized to monitor and respond to the user control input of the user to the vehicle in furtherance of advantages such as safety, efficiency, and comfort of the vehicle.

However, devices that monitor the user control input of a user and alter the conditions based on the instant condition of the vehicle, or that advise the user to operate the vehicle differently to alleviate an instant problem such as incorrect gear selection, may not be capable of addressing the causes of the problems. FIG. 1 illustrates exemplary scenarios in which monitoring, altering, and advising the user regarding the instant conditions of the vehicle may fail to achieve some advantages that may be achievable in other techniques. In a first exemplary scenario 100 of FIG. 1, at a first time point 106 and in a particular driving context 104 (e.g., sunny daytime weather), a user 110 of a second vehicle 108 may operate the vehicle 108 at a particular speed 112 (e.g., 45 kilometers per hour) and while maintaining a particular braking distance 114 with respect to a first, leading vehicle 108. At a second time point 106, the user 110 of the first vehicle 108 may activate brakes 116, resulting in a hard stop and skidding, and the user 110 of the second vehicle 108 may also activate the brakes 116 to avoid a collision. The degree of braking 116 may ordinarily result in a lockup condition that extends the braking distance 114 and results in a collision. Instead, the vehicle 108 may activate antilock brakes in order to shorten the achieved braking distance 114 and to stop the second vehicle 108 with a braking margin 118 from the first vehicle 108 and to avoid a collision. The vehicle 108 may also present an antilock braking warning 120 to the user 110 to indicate the use of this braking system. Accordingly, the user 110 may correctly perceive that the braking distance 114 form the first vehicle 108 was adequate for the driving context 104. However, in a similar second scenario 102, the user 110 may also operate the vehicle 108 with a braking distance 114 from a first vehicle 108. However, a different driving context 104 of rainy weather may alter the road surface, and when the first vehicle 108 activates brakes 116, the same amount of braking, and even the activation of the antilock braking system, may be unable to mitigate the extended braking distance 116 and may result in a collision 122.

In the scenarios illustrated in the exemplary scenarios of FIG. 1, it may be appreciated that the antilock braking system may have performed adequately in both scenarios; even in the second scenario 102 resulting in a collision 122, the reduced braking distance 116 achieved by antilock braking may significantly reduce the severity of the collision 122. However, the active monitoring and response to the instant conditions of the vehicle 108 was inadequate to avoid a collision 122, or to address the cause of the collision, i.e., the selected braking distance 114 maintained by the user 110 with respect to the first vehicle 108. That is, the responsiveness of the antilock braking system in the first scenario 100 did not alter the user driving behavior of the user 110, and the same user driving behavior led to the collision 122 in the second exemplary scenario 102. Indeed, the automated activation of the antilock braking system may have reinforced an incorrect perception of the user 110 as to safe braking distances 114 in various driving contexts 104, as an example of the psychological concept identified as "moral hazard."

By contrast, the collision 122 in the exemplary first scenario 102 of FIG. 1 may have been avoided by other techniques addressing the cause of the collision, such as advising the user 110 as to proper braking distances 116. That is, alternative or in addition to advising the user 110 of current conditions (e.g., applying antilock brakes to avoid a collision 122), a device may advise the user 110 regarding braking distances 116, both in the instant circumstance and more generally. For example, in the second exemplary scenario 102, many thought processes of the user 110 may have resulted in the selection of an inadequate braking distance 116. As a first example, the user 110 may not have understood the inadequacy of the braking distance 116 (e.g., an inexperienced driver may not have understood the effect of rain on the road surface). In part, the user 110 may have felt that the braking distance 116 was adequate because of the avoidance of the collision 112 in the first exemplary scenario 100. As a second example, the user 110 may have understood the inadequacy of the braking distance 116, but may have incorrectly perceived the availability or value of an alternative selection (e.g., that even a modest extension of the braking distance 116 may have significantly reduced the odds of a collision 116). As a third example, the user 110 may have generally understand safe braking distance 116, the inadequacy of the current braking distance 116, and the advantage of leaving an extended braking distance 116, but may simply have failed to attend to the instant scenario (e.g., selecting an inadequate braking distance due to distraction, habit, or an overestimation of the braking distance 116 to the leading vehicle 108).

These and other factors, relating to the user driving behavior of the user 110 with respect to braking distance, may have significantly caused the collision 122 in the second exemplary scenario 102 of FIG. 1. It may be appreciated that a device may have automatically monitored the braking distance 116 with respect to a current vehicle 108 and warned the user as to the adequacy of the braking distance (e.g., noting in the second exemplary scenario 102 of the extended braking distance 116 due to the rainy weather driving context 104), thus prompting the user 110 to leave more distance that may have avoided the collision 122. Moreover, such advising may assist the user 110 in other driving scenarios, such as when operating a different vehicle that is not equipped with a monitoring and advising device.

B. Presented Techniques

Presented herein are techniques for assisting a user 110 in the control of a vehicle 108 through personalized advice as to the user driving behaviors of the user. In accordance with these techniques, a device may monitor the vehicle control input of the vehicle 108 by a user 110 in order to identify a user driving behavior of the user 110 in a driving context 104. The device may also identify at least one alternative driving behavior providing an advantage over the user driving behavior of the user 110 for operating the vehicle 108 in the driving context 102, and present to the user 110 a driving suggestion of the alternative driving behavior in the driving context 104.

Figure 2:
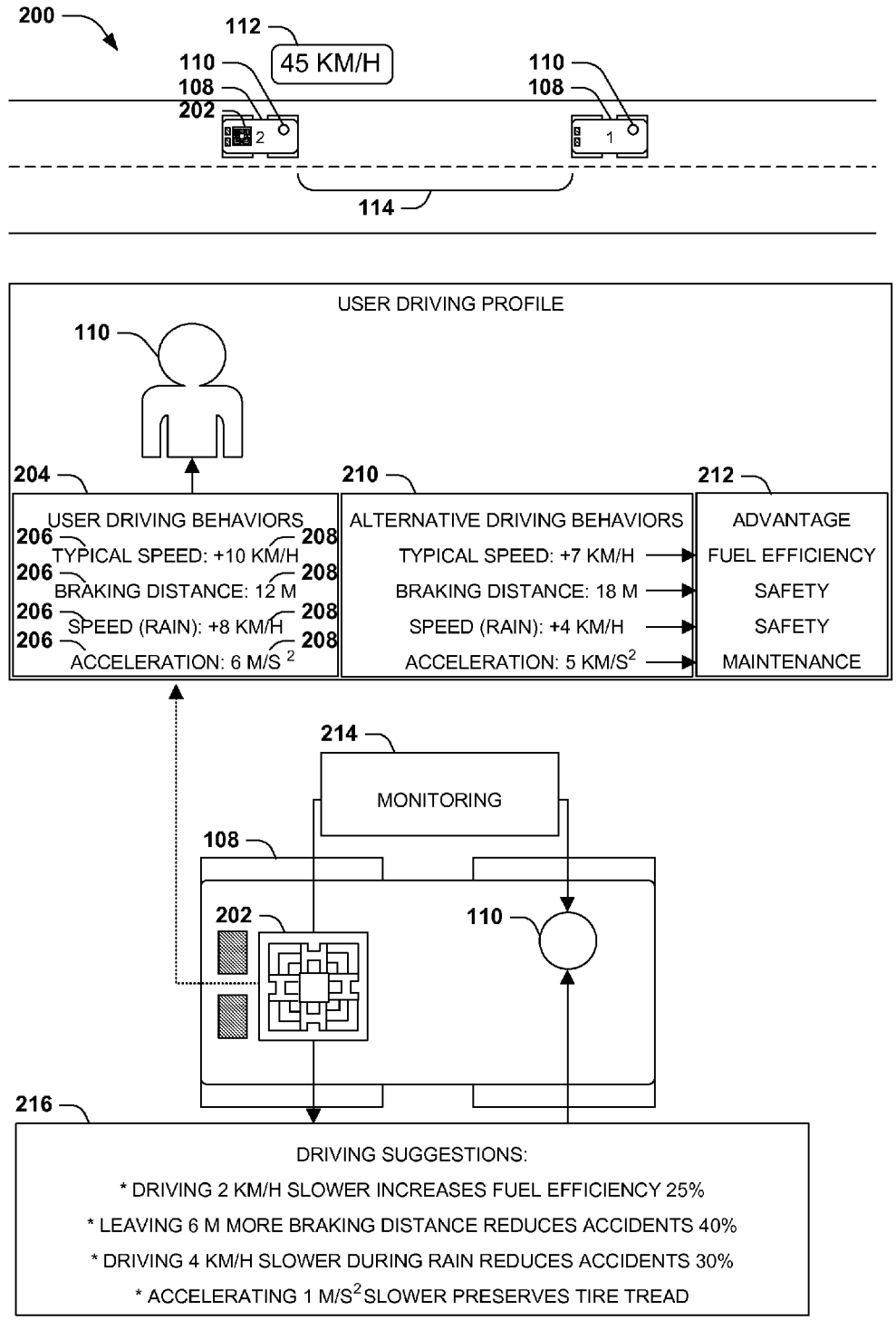
FIG. 2 is an illustration of an exemplary scenario featuring an identification of the user driving behaviors of users of a vehicle in various contexts, and the automated control of driving features of the vehicle reflecting the user driving behaviors, in accordance with the techniques presented herein.

FIG. 2 presents an illustration of an exemplary scenario 200 featuring the facilitation of a user 110 operating a vehicle 108 according to the techniques presented herein. In this exemplary scenario 200, at a particular time point, the user 110 may operate a vehicle 108 according to a user driving behavior set 204 comprising, for respective driving features 206 of the vehicle 108, a user driving behavior 208 (e.g., for the speed 112 of a vehicle 108, a typical or average speed of the vehicle 108 selected by the user 110; or for a braking distance of the vehicle 108 with respect to a leading vehicle 108, a typical or average braking distance of the vehicle 108 selected by the user 110). A device 202 on board the vehicle 108 may monitor the user control inputs of the user 110 to the vehicle 108, and based on such monitoring, may identify the user driving behavior set 204. For example, the device 202 may determine that the user 110 typically operates the vehicle 108 at 10 kilometers per hour over the posted speed limit, or 8 kilometers per hour over the posted speed limit in a rainy driving context 104; may typically leave 12 meters of braking distance with respect to a leading vehicle; and may typically accelerate at a rate of 6 meters per second squared. A device 202 may also provide suggestions that account for variations in braking distance based on the condition of the vehicle 108, such as the number of passengers, cargo weight inside or outside the vehicle 108 (e.g., a pulled trailer), and tire inflation. These user driving behaviors 208 may affect various properties of the operation of the vehicle 108, such as the fuel efficiency, safety, and maintenance of the vehicle. According to some techniques (such as the techniques illustrated in the exemplary scenario 100 of FIG. 1), the vehicle 108 may utilize techniques to mitigate the effects of these user driving behaviors 208 and to inform the user of the effects of such user driving behaviors 208, such as activating antilock braking systems to mitigate an inefficient locking-up of the brakes of the vehicle 108, or warning the user 110 that the current gear is not suitable for the current speed of the vehicle 108. However, in accordance with the techniques presented herein, a device 202 (e.g., a local device on board the vehicle 108, or a remote device such as a server that is in communication with the vehicle 108) may monitor 214 the user driving behaviors 208 of the user 110 in a particular driving context 104, and identify at least one alternative driving behavior 210 that confers an advantage 212 with respect to the user driving behavior 208. Upon identifying the alternative driving behavior 210 and the advantage 212, the vehicle 108 may present to the user 110 a driving suggestion 216 indicating an alternative driving behavior 210 and the advantage 212 of such alternative driving behavior 210 in the driving context 104. For example, the device 202 may determine that reducing the typical driving speed of the user 110 may increase the fuel efficiency of the driving; that leaving more braking distance than the user 110 typically chooses may reduce accidents; that reducing the user's typical driving speed in rainy conditions may reduce accidents; and that reducing the typical acceleration rate of the user 110 may preserve tire tread.

The techniques presented herein may confer various advantages as compared with other techniques for responding to user control input (such as the exemplary scenarios of FIG. 1). As a first example, the techniques presented herein involve the determination of advantageous alternative driving behaviors 210 in view of the user driving behaviors 108 of the particular user 110. That is, the driving suggestions 216 presented herein are personal to the user; e.g., a user may not be persuaded by general advice such as "slower speeds reduce accidents," but may be persuaded by personalized advice, such as "you are 25% more likely to be involved an accident than if you typically drove 2 km/h more slowly." In addition, such personalization avoids presenting driving suggestions 216 that are not applicable to the user 110 (e.g., it may be undesirable to notify the user 110 that slower speeds typically cause fewer accidents if the typical speed of the user 110 is already optimal for accident avoidance, as such inapplicable suggestions may desensitize the user 110 to the presentation of driving suggestions 216). As a second example, the techniques presented herein involve the monitoring 214 of user driving behaviors 204 in particular driving contexts 104 to provide contextual suggestions; e.g., particularly examining the typical speed of the user 110 in rainy driving conditions to determine and suggest advantages relating to the speed of the vehicle 108 in rainy driving conditions. As a third example, the techniques presented herein are based on the determination of an alternative driving behavior 210 and a specific advantage 212. For example, antilock braking systems may detect and notify the user 110 of currently low traction on an icy road, but if the user 110 is unaware of any way of achieving greater traction, then the presentation of the notification is futile. Rather, the techniques presented herein involve identifying a driving suggestion 216 that confers an advantage 212, such as driving slower, leaving more braking distance, or braking less firmly as driving suggestions 216 for achieving greater traction in low-traction scenarios. These and other advantages may be achievable by the techniques presented herein.

C. Exemplary Embodiments

Figure 3:
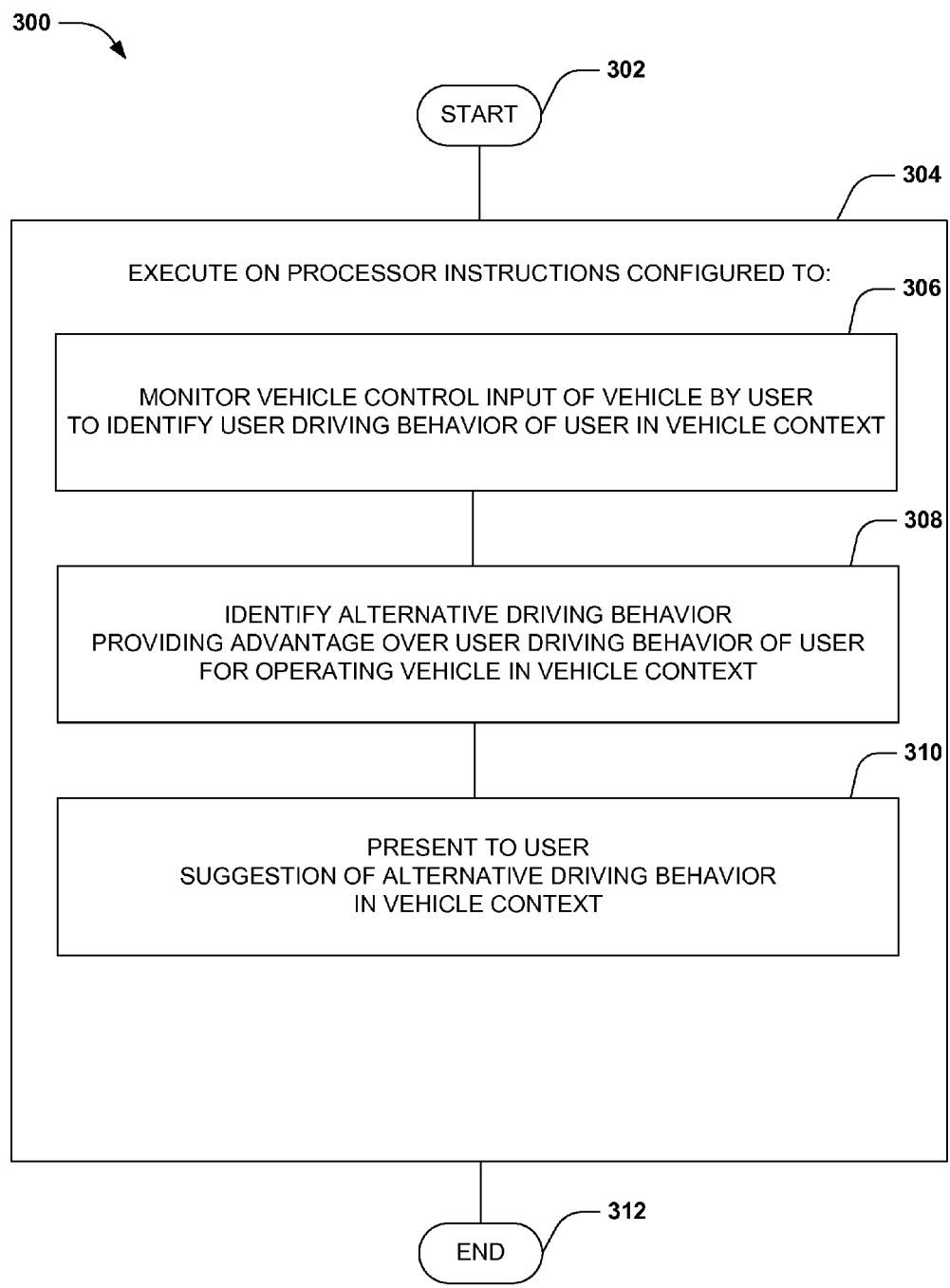
FIG. 3 is an illustration of an exemplary method of controlling a vehicle operated by a user in accordance with the techniques presented herein.

FIG. 3 presents a first exemplary embodiment of the techniques presented herein, illustrated as an exemplary method 300 of advising a user 110 in the operation of a vehicle 108. The exemplary method 300 involve a device having a processor and having access to vehicle control input from the user 110 to the vehicle 108. The exemplary method 300 may be implemented, e.g., as a set of instructions stored in a memory component of a device (e.g., a memory circuit, a platter of a hard disk drive, a solid-state memory component, or a magnetic or optical disc) that, when executed by the processor of the device, cause the device to perform the techniques presented herein. The exemplary method 300 begins at 302 and involves executing 304 the instructions on the processor. Specifically, the instructions are configured to monitor 306 a vehicle control input of the vehicle 108 by the user 110 to identify a user driving behavior 208 of the user in a driving context 104. The instructions are further configured to identify 308 at least one alternative driving behavior 210 providing an advantage 212 over the user driving behavior 208 of the user 110 for operating the vehicle 108 in the driving context 104. The instructions are further configured to present 310 to the user 110 a driving suggestion 216 of the alternative driving behavior 210 in the driving context 104. In this manner, the exemplary method 300 of FIG. 3 achieves the presentation of personalized, contextualized driving suggestions 216 of alternative driving behaviors 210 and the advantages 212 thereof, and so ends at 312.

Figure 4:
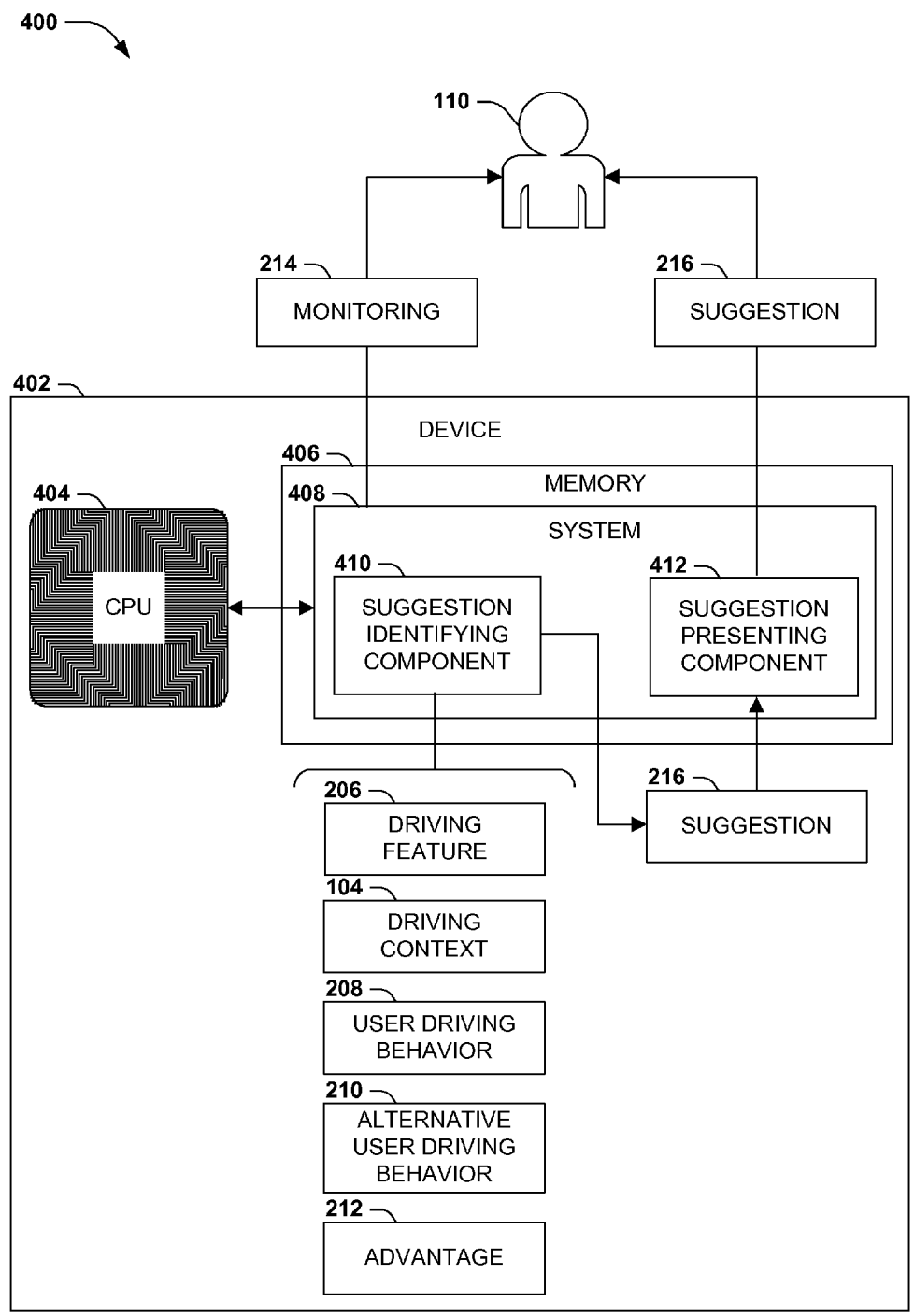
FIG. 4 is a component block diagram of an exemplary system for controlling a vehicle operated by a user in accordance with the techniques presented herein.

FIG. 4 presents an illustration of an exemplary scenario 400 featuring a second exemplary embodiment of the techniques presented herein, illustrated as an exemplary system 408 for advising a user 110 in the operation of a vehicle 108. The exemplary system 408 may be implemented, e.g., on a device 402 having a processor 404 and a memory 406 and having access to vehicle control input provided by the user 110 to the vehicle 108. Respective components of the exemplary system 408 may be implemented, e.g., as a set of instructions stored in a memory 406 of the device 402 and executable on the processor 404 of the device 402, such that the interoperation of the components causes the device 402 to operate according to the techniques presented herein. The exemplary system 408 comprises a suggestion identifying component 410, which monitors 214 the vehicle control input of the vehicle 108 by the user 110 to identify a user driving behavior 208 of the user for various driving features 206 of the vehicle 108 in a driving context 104, and identifies at least one alternative driving behavior 210 providing an advantage 212 over the user driving behavior 208 of the user 110 for operating the vehicle 108 in the driving context 104. The exemplary system 408 also comprises a suggestion presenting component 412, which presents to the user 110 a driving suggestion 216 of the alternative driving behavior 210 in the driving context 104. The interoperation of the components of the exemplary system 408 of FIG. 2 thereby achieves the selection and presentation of the driving suggestion 216 of the alternative driving behavior 210 for the driving feature 206 and the driving context 104 and the advantage 212 of the alternative driving behavior 210.

Still another embodiment involves a computer-readable medium comprising processor-executable instructions configured to apply the techniques presented herein. Such computer-readable media may include, e.g., computer-readable storage media involving a tangible device, such as a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a CD-R, DVD-R, or floppy disc), encoding a set of computer-readable instructions that, when executed by a processor of a device, cause the device to implement the techniques presented herein. Such computer-readable media may also include (as a class of technologies that are distinct from computer-readable storage media) various types of communications media, such as a signal that may be propagated through various physical phenomena (e.g., an electromagnetic signal, a sound wave signal, or an optical signal) and in various wired scenarios (e.g., via an Ethernet or fiber optic cable) and/or wireless scenarios (e.g., a wireless local area network (WLAN) such as WiFi, a personal area network (PAN) such as Bluetooth, or a cellular or radio network), and which encodes a set of computer-readable instructions that, when executed by a processor of a device, cause the device to implement the techniques presented herein.

Figure 5:
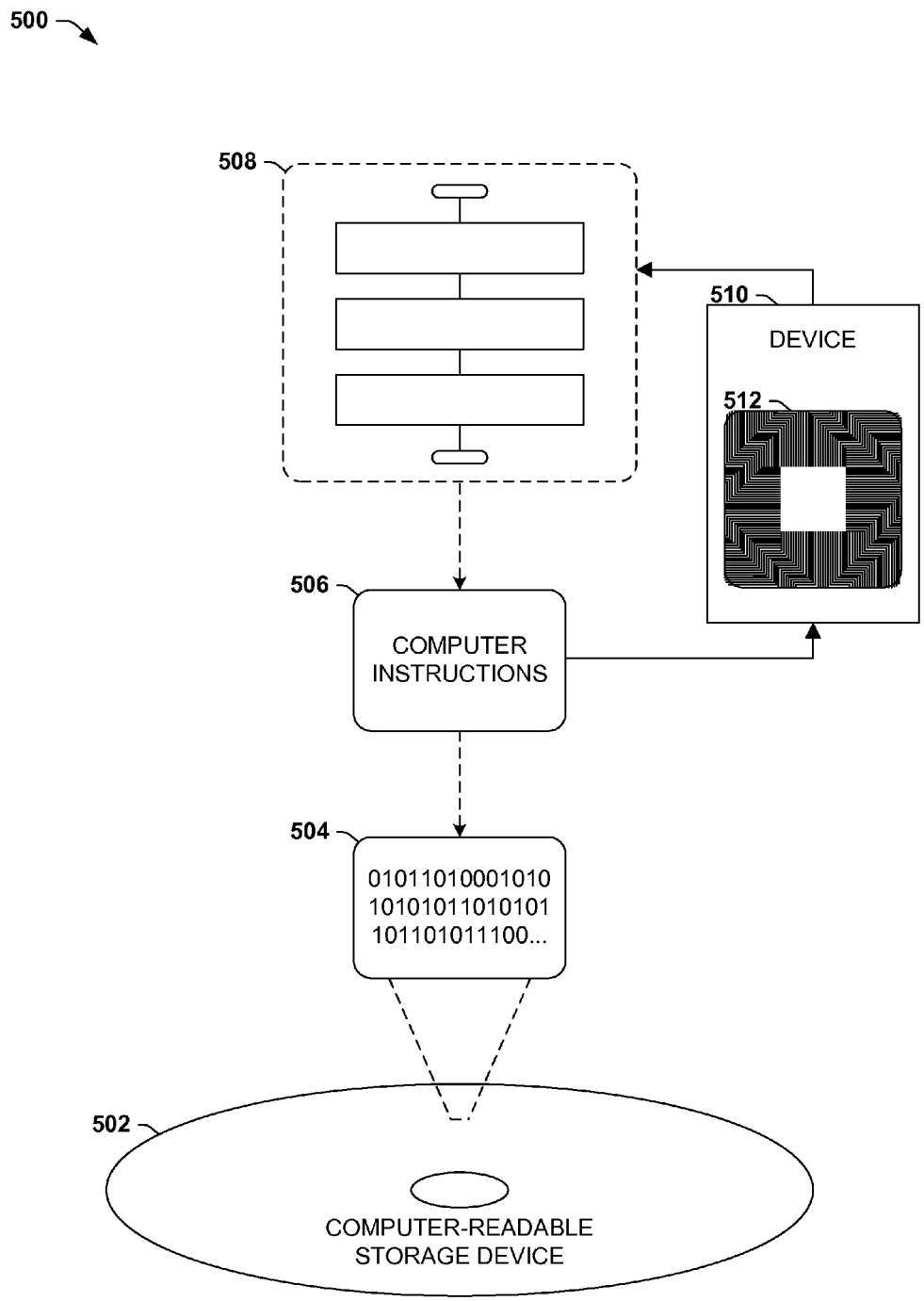
FIG. 5 is an illustration of an exemplary computer-readable medium comprising processor-executable instructions configured to embody one or more of the provisions set forth herein.

An exemplary computer-readable medium that may be devised in these ways is illustrated in FIG. 5, wherein the implementation 500 comprises a computer-readable medium 502 (e.g., a CD-R, DVD-R, or a platter of a hard disk drive), on which is encoded computer-readable data 504. This computer-readable data 504 in turn comprises a set of computer instructions 506 configured to operate according to the principles set forth herein. In a first such embodiment, the processor-executable instructions 506 may be configured to, when executed by a processor 512 of a device 510, cause the device 510 to advise a user 110 in the operation of a vehicle 108, such as the exemplary method 300 of FIG. 3. In a second such embodiment, the processor-executable instructions 506 may be configured to implement a system for advising a user 110 in the operation of a vehicle 108, such as the exemplary system 408 of FIG. 4. Some embodiments of this computer-readable medium may comprise a nontransitory computer-readable storage medium (e.g., a hard disk drive, an optical disc, or a flash memory device) that is configured to store processor-executable instructions configured in this manner. Many such computer-readable media may be devised by those of ordinary skill in the art that are configured to operate in accordance with the techniques presented herein.

Figure 6:
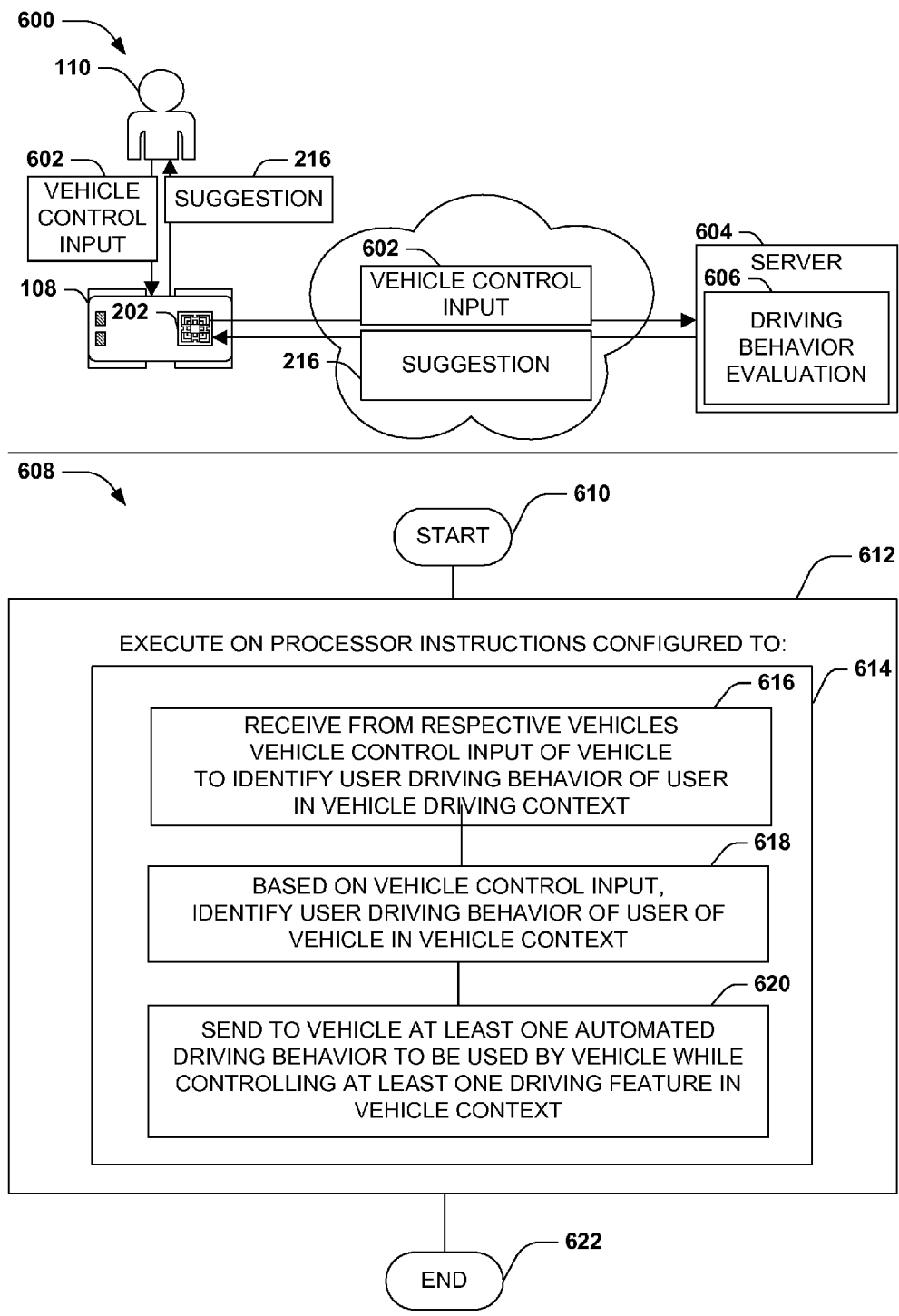
FIG. 6 is an illustration of an exemplary scenario featuring a second exemplary method of controlling vehicles according to user driving behaviors in accordance with the techniques presented herein.

Some embodiments of the techniques presented herein may involve an interoperation of devices in order to achieve the techniques presented herein. FIG. 6 presents an illustration of an exemplary scenario 600 featuring a distributed technique involving a server 604 intercommunicating with a device 202 in order to advise a user 110 in the operation of a vehicle 108. In this exemplary scenario 600, the device 202 detects vehicle control input 602 provided by the user 110 (e.g., input to the accelerator, brake, gearshift, and steering wheel) while operating the vehicle 108 in a driving context 104, and sends the vehicle control input 602 to the server 604 (e.g., through a wireless uplink with a communications network such as the internet). The server 604 performs a driving behavior evaluation 606, e.g., by performing an exemplary method 608 beginning at 610 and involving executing 612 instructions 614 on a processor of the server 604. In particular, the instructions 614 involve receiving 616 from respective vehicles 108 at least one vehicle control input 602 of the vehicle 108 to identify a user driving behavior 208 of the user in a driving context 104; identifying 618, based on the vehicle control input 602 and for the vehicle driving context 104, at least one alternative driving behavior 210 providing an advantage 212 for vehicles 108 operating in the driving context 104; and instructing 620 at least one vehicle 108 operated by a user 110 in a driving context 104 according to a user driving behavior 208 that is less advantageous than the alternative driving behavior 210, to present to the user 110 a driving suggestion 216 of the alternative driving behavior 210, at which point the exemplary method 608 ends at 622. The vehicle 108 receiving the driving suggestion 216 from the server 604 may therefore present the driving suggestion 216 to the user 110, thus facilitating the user 110 in the optimal operation of the vehicle 108 in accordance with the techniques presented herein.

D. Variable Aspects

The techniques discussed herein may be devised with variations in many aspects, and some variations may present additional advantages and/or reduce disadvantages with respect to other variations of these and other techniques. Moreover, some variations may be implemented in combination, and some combinations may feature additional advantages and/or reduced disadvantages through synergistic cooperation. The variations may be incorporated in various embodiments (e.g., the exemplary method 300 of FIG. 3; the exemplary system 408 of FIG. 4; the exemplary computer-readable storage device 502 of FIG. 5; and the exemplary method 608 of FIG. 6) to confer individual and/or synergistic advantages upon such embodiments.

D1. Scenarios

A first aspect that may vary among embodiments of these techniques relates to the scenarios wherein such techniques may be utilized.

As a first example of this first aspect, the techniques presented herein may be used with many types of vehicles 108, including automobiles, motorcycles, trucks, buses, watercraft, aircraft, and spacecraft.

As a second example of this first aspect, the techniques presented herein may be used to automate the control many types of types of driving features 206 of the vehicle 108, such as an accelerator, or throttle, brake, gear selector, steering wheel, tiller, or yolk. The driving features 206 may also include vehicle accessories, including interior and exterior lighting; windshield wipers; cleaning, anti-fogging, and/or de-icing controls; climate controls; sound systems; and communication with other vehicles 108 and individuals. Additionally, the driving features 206 may be correlated with various types of user driving behaviors 208, such as vehicle speed or vehicle acceleration; lane selection among at least two lanes of a causeway; vehicle turning rate (e.g., the effects of turning too sharply or gradually at different speeds); vehicle gear selection; vehicle signaling input (e.g., the use of turn signals); and vehicle climate control (e.g., the use of a defogger or windshield wipers to clear weather-related obstructions).

As a third example of this first aspect, the techniques presented herein may be used to evaluate the user driving behaviors 206 of the user 110 while operating the vehicle 108 in a variety of driving contexts 106, including the time of day; sunny, overcast, foggy, rainy, snowing, and/or freezing weather conditions; a vehicle causeway type context (e.g., an unpaved local road, a residential side street, a main roadway, or a highway); a traffic congestion context (e.g., the volume of traffic in the vicinity of the vehicle 108); a vehicle speed of at least one other vehicle 108 operating near the vehicle 108 (e.g., if the vehicle 108 is passing, being passed by, or keeping pace with other vehicles 108); the route of the vehicle 108 (e.g., a short local route, a longer cross-city route, or a long-distance route between cities); and a vehicle condition context (e.g., the maintenance condition and/or cargo contents of the vehicle 108); and a vehicle passenger context (e.g., the number and identities of other passengers aboard the vehicle 108).

As a fourth variation of this first aspect, the evaluation of the driving behavior of the user 110 may be performed in view of many types of advantages 212, such as the safety of the vehicle 108 or the occupants; the safety of other individuals near the vehicle 108, such as other drivers, motorcyclists, bicyclists, and pedestrians; the maintenance of the vehicle 108, such as evaluating acceleration with respect to the effects on tire tread, and evaluating gearshift operation with respect to preserving the engine components; the efficiency of the vehicle 108, such as fuel economy and pollution reduction; the compliance with laws, such as posted speed limits and traffic control signs, assured clear distance limits, and the use of headlights for visibility; and the driving comfort of the vehicle 108, such as promoting a smooth ride. Many types of advantages 212 may be achievable in view of such considerations, such as a fuel economy promoting advantage; an emissions reducing advantage; a vehicle maintenance promoting advantage; a travel time reducing advantage; a driving safety promoting advantage; a causeway hazard avoiding advantage; and a smooth driving experience promoting advantage. These and other variations may be included in various embodiments of the techniques presented herein.

D2. User Driving Behavior Evaluation

A second aspect that may vary among embodiments of these techniques involves the detection the user driving behaviors 208 of the driving features 206 of the vehicle 108, and the driving context 104 which the user 110 is operating the vehicle 108, in order to select one or more suggestions 216 providing advantages 212 with respect to the operation of the vehicle 108.

As a first variation of this second aspect, the driving context 104 of the vehicle 108 may be detected in various ways. As a first such example, the driving context 104 may be detected by a device 202 on board the vehicle 108 through communication with various sensors, e.g., a clock that provides the time of day, and ambient sensors that detect the temperature, light level, and moisture. As a second such example, the driving context 104 may be inferred from the driving features 206 of the vehicle, e.g., inferring from an activation of antilock brakes that a road is wet or icy. As a third such example, nearby vehicles 108 traveling in a local region may intercommunicate to determine the driving conditions; e.g., a first vehicle 108 that detects a slippery road surface may broadcast this driving context 104 to other vehicles 108 in the area. As a fourth such example, the driving context 104 may be received as a set of driving context descriptors from a driving context service (e.g., a service accessible over a communications network that informs the device 202 on board the vehicle 108 of the driving conditions in the area, such as the ambient weather and road surface conditions).

As a second variation of this second aspect, many types of evaluation may be performed to identify alternative driving behaviors 210 conferring an advantage 212 as compared with the current user driving behavior 208 of the user 110. As a first example, a device 202 may comprise a model associating various user driving behaviors 204 with comparative advantages 212, such as the risks of causing an accident while operating a vehicle 108 at different speeds in a particular driving context 104, and the device 202 may compare the current user driving behavior 208 of the user 110 with the model to select an alternative driving behavior 210 presenting a comparative advantage 212. As a second example, a device 202 may comprise a simulator that predicts various effects of a current user driving behavior 208 in a particular driving context 104 and the comparative effects of alternative driving behaviors 210 in the driving context 104, and selects for suggestion the alternative driving behaviors 210 presenting a comparative advantage 212. For example, a simulator may predict the braking distance 114 of a vehicle 108 operating at a current speed 112 in a particular driving context 104, and may also predict the braking distance 114 of the vehicle 108 operating at a different speed 112. If the current speed 112 provides insufficient braking distance 114 with respect to a leading vehicle 108 or involves an uncomfortable stopping experience, and the different speed 112 alleviates these disadvantages, then a driving suggestion 216 may be selected and presented based on the different speed 112 and the reduction of the disadvantage.

As a third variation of this second aspect, many architectural variations may be utilized to perform the detection and evaluation of user driving behaviors 208 and suggestions 216 related thereto. As a first such example, such as illustrated in the exemplary scenario 400 of FIG. 4, the detection, evaluation, and suggestion may be performed by a device 202 on board the vehicle 108. As a second such example, such as illustrated in the exemplary scenario 600 of FIG. 6, the vehicle control input 602 may be detected by a device 202 on board the vehicle 108 and sent to a driving behavior evaluating service provided by a server 604 that remotely performs a driving behavior evaluation 606 and sends suggestions 216 back to the device 202 for presentation to the user 110 in the vehicle 108. Upon receiving the driving suggestion 216 from the user driving behavior service, the device may present the driving suggestions to the user 110. As a third such example, rather than sending the driving suggestions 216 to the user 110, the server 604 may present the driving suggestions 216 to the user 110 outside of the vehicle 108, e.g., through email or through a web service, for review by the user 110 at a later date in order to alter the user driving behaviors 208 of the user 110 in future driving contexts 104.

As a fourth variation of this second aspect, the selection of suggestions 216 to the user 110 may be limited to those having a comparative advantage exceeding a comparative advantage threshold. For example, a user 110 who typically utilizes vehicle brakes in a fairly safe manner that might confer a modest first advantage 212 through an adjustment of such usage (e.g., braking slightly more gradually may modestly reduce maintenance costs), and may utilize the accelerator in a manner such that an alternative accelerating technique may provide a significant second advantage 212 in terms of reduced maintenance costs. Accordingly, the device 202 may present the second suggestion 216 presenting a significant advantage 212, and may refrain from presenting the first suggestion 216 presenting only a modest advantage 212. Alternatively or additionally, two or more alternative driving behaviors 210 may each present an advantage 212 over a current user driving behavior 208 (e.g., excessive speed 112 during curves 710 may be alleviated either by braking harder before entering the curve 710, or by initiating braking at a farther distance before the curve 710). The device 202 may compare the comparative advantages 210 of various alternative driving behaviors 210 to identify a positive comparative advantage 210 (e.g., that the comparative advantage 212 of initiating braking farther before a curve 710 presents a greater comparative advantage 212 than braking harder before the curve 710), and may select for presentation the driving suggestion 216 for the alternative behavior 210 having the positive comparative advantage 212. These and other variations in the detection and evaluation of the user driving behaviors 208 may be incorporated in embodiments of the techniques presented herein.

D3. Presentation of Suggestions

A third aspect that may vary among embodiments of these techniques involves the presentation of suggestions 216 relating to various advantages 212 achievable by various alternative driving behaviors 210.

As a first set of variations of this third aspect, the timing of the presentation of suggestions 216 may be selected to provide contextual relevance to the driving context 104 of the vehicle 108 and user 110. As a first such example, a driving suggestion 216 may be helpfully displayed at a particular location, such as a particular geographic position on a road where the driving context 104 for the user driving behavior 208 is likely to arise, and the device 202 may identify such suggestion locations and present such suggestions 216 upon the vehicle 108 arriving at such a location. As a second such example, the device 202 may identify at least one alternative driving behavior 210 at a first time point that is associated with a first instance of the driving context 104 (e.g., detecting that the user 110 did not react advantageously to an instance of skidding on a slippery road surface), and may present the driving suggestion 216 to the user 110 at a second time point that is associated with an impending second instance of the driving context 104 (e.g., presenting a driving suggestion 216 to the user 110 for handling skidding more advantageously upon later detecting a slippery road surface that may induce skidding). The timing of such suggestions 216 may promote the retention and use of the alternative driving behaviors 210 by the user 110.

Figure 7:
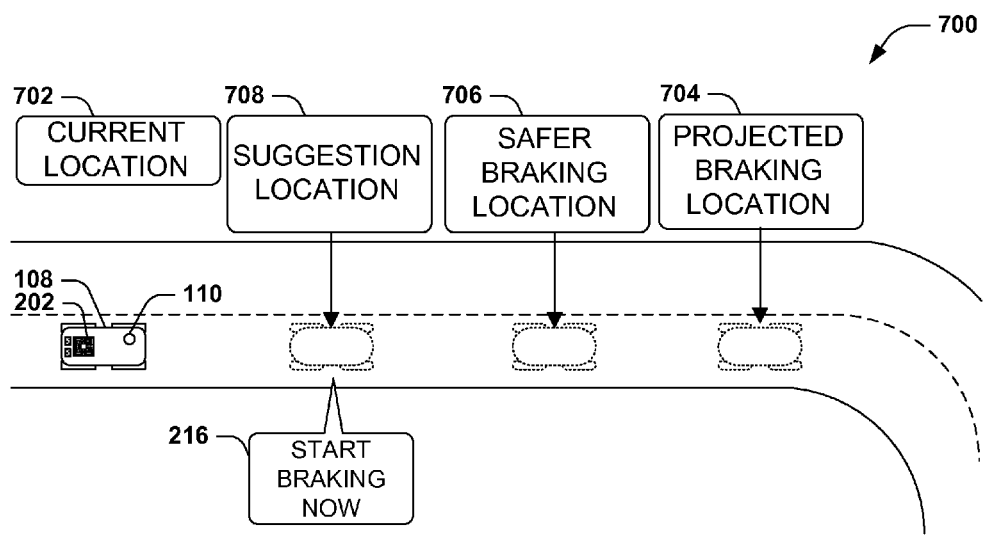
FIG. 7 is an illustration of an exemplary scenario featuring techniques for further personalizing the driving features of a vehicle in accordance with the techniques presented herein.

FIG. 7 presents an illustration of an exemplary scenario 700 depicting these first variations of this third aspect, involving at least one alternative driving behavior 210 associated with a driving suggestion location for presenting a driving suggestion 216 relating to a selected location. In this exemplary scenario 700, the user driving behavior 208 relates to the speed of the vehicle 108 while traversing a curve 710 in a roadway; e.g., the user 110 may typically take curves too fast in a manner that reduces the safety of the vehicle 108 and/or increases wear on components of the vehicle 108, such as wear of tire tread due to avoidably tight, high-speed turns, or wear of brake pads due to avoidably hard braking. Rather than simply warning the user 110 upon detecting that the vehicle 108 is currently traversing a curve at an undesirably high speed 112 (based on the instant circumstances of the vehicle 108 and the vehicle control input 602), a device 202 may determine a user driving behavior 208 that may cause this condition to arise, e.g., that the user 110 initiates braking too close to entering the curve 710, and an alternative driving behavior 210 (e.g., initiating braking a farther distance before the curve 710) that may provide advantages 212 (e.g., increased safety, particularly in rainy driving conditions 104; increased comfort; and/or reduced wear on the vehicle 108). Additionally, rather than notifying the user 110 of the alternative driving behavior 210 and advantages 212, the device 202 may present the driving suggestion 216 relating to the alternative driving behavior 210 at a suggestion location 708. For example, the device 202 may detect an approaching curve 710 and, based on the user driving behavior 208 with respect to speed 112 and curves 710 related to a current driving context 104 (e.g., current weather conditions), may predict a projected braking location 704 of the vehicle 108 where the user 110 is likely to initiate braking for the curve 710. The device 202 may also detect a safer braking location 706 that confers one or more advantages 212, and a suggestion location 708 where the user 110 may present the driving suggestion 216 to the user 110 with sufficient time to utilize the driving suggestion 216 (e.g., taking into account the reaction time of the user 110) for the selected location. In this manner, the device 202 may choose the presentation of the driving suggestion 216 in a manner that facilitates the adoption of the driving suggestion 216.

A second set of variations of this third aspect relate to limiting the numbers and types of suggestions 216 presented to the user 110, in order to avoid diluting the driving suggestions 216 and persuasiveness thereof by presenting suggestions 216 that are not of interest to the user 110.

As a first example of this second variation of this third aspect, the selection of suggestions 216 may be customized by the user 110, e.g., based on the types of advantages 212 that are of interest to the user 110. For example, the user 110 may be more interested in suggestions 216 for advantages 212 relating to safety, but may be less interested in suggestions 216 for advantages 212 relating to vehicle maintenance. Accordingly, the device 202 may receive from the user at least one selected advantage 212 from an advantage set, and to present only suggestions 216 that relate to at least one selected advantage 212 received from the user 110. For example, with reference to the exemplary scenario 700 of FIG. 7, if reduced speed during curves 710 promotes both the safety of the user 110 and reduces maintenance costs, but the user 110 is only interested in suggestions 216 relating to safety, the device 202 may present the driving suggestion 216 to start braking sooner and may advise doing so in order to promote the safety of the user 110, but may refrain from additionally noting that the earlier braking reduces maintenance costs.

As a second example of this second variation of this third aspect, the selection of suggestions 216 may be customized to reduce the number of suggestions 216 presented in a particular period, which may cause the user 110 to become desensitized to the presented suggestions 216. For example, the device 202 may define a suggestion count threshold for a suggestion time period (e.g., presenting no more than five messages per day), and may present suggestions to the user 110 not exceeding the suggestion count threshold within the suggestion time period.

As a third example of this second variation of this third aspect, the selection of suggestions 216 may be implemented to avoid repeatedly presenting suggestions 216 that the user 110 does not wish to receive. For example, upon detecting a declinement by the user 110 of a driving suggestion 216 in a driving context 104, a device 202 may refrain from subsequently presenting the driving suggestion 216 to the user 110 in the driving context 104.

Figure 8:
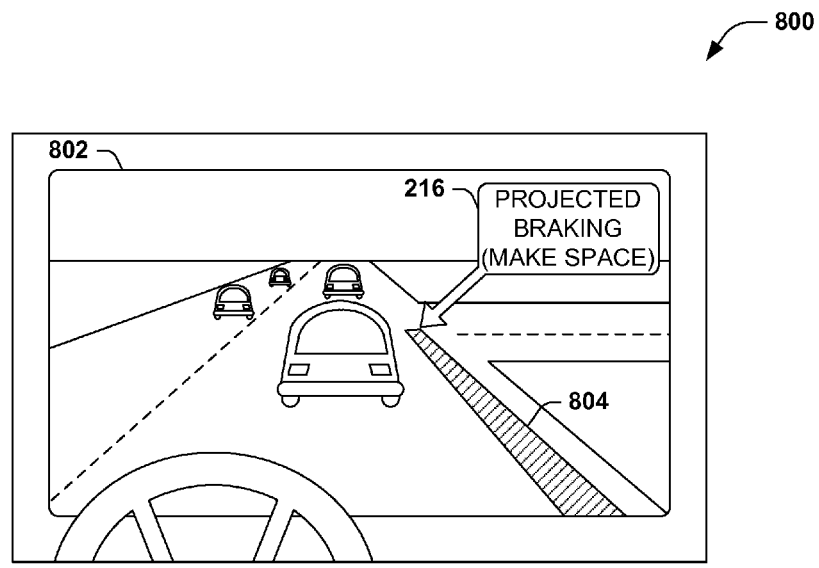
FIG. 8 is an illustration of an exemplary scenario featuring techniques for classifying users according to a driving behavior type in accordance with the techniques presented herein.

FIG. 8 presents an illustration of an exemplary scenario 800 featuring a third variation of this third aspect, pertaining to the manner of presenting the driving suggestion 216 to the user 110. In this exemplary scenario 800, the user 110 operates the vehicle 108 while viewing a driving through a window 802, such as a windshield of an automobile, or a set of glasses worn by the user 110. A device 202 may present the driving suggestion 216 to the user 110 by displaying the driving suggestion 108 on the window 802 (e.g., by projecting the driving suggestion 108 onto the window 802; by activating a transparent liquid crystal display (LED) component integrated with the window 802; and/or by displaying the driving suggestion on a lens of a pair of glasses worn by the user 110). Additionally, where the driving suggestion 216 relates to an object that is viewable through the window 802, the device 202 may position the driving suggestion 216 on the window to visually indicate the object related to the driving suggestion 216. For example, a driving suggestion 216 relating to braking distance may present, displayed on the window 802, a visual indicator 804 on the road of the projected stopping point at the current speed 112 of the vehicle 108, in relation to the position of a leading vehicle 108, may be displayed as part of a driving suggestion 216 to the user 110 to slow down to expand the braking distance 114 with respect to the leading vehicle 108.

As a third variation of this third aspect, a device 202 may assist the user 110 in accepting and/or utilizing a driving suggestion 216.

As a first example of this third variation of this third aspect, the device 202 may present to the user 110 an option to accept a driving suggestion 216, and upon receiving an acceptance of the driving suggestion 216, may control the vehicle 108 to implement the driving suggestion 216. For example, if the driving suggestion 216 involves reducing the speed of the vehicle 108 (e.g., to expand braking distance 114 with respect to a leading vehicle 108) and the user 110 accepts the driving suggestion 216, the device 202 may automatically and gradually reduce the speed 112 of the vehicle 108.

As a second example of this third variation of this third aspect, the device 202 may offer to the user 110 an alternative driving behavior incentive for accepting a driving suggestion 216, and, upon detecting an acceptance of the driving suggestion 216 by the user 110, confer the alternative driving behavior incentive to the user 110. For example, the driving suggestion 216 may comprise the alternative driving behavior 210 of reduced speed 112 of the vehicle 108 in furtherance of the advantage 212 of reduced emissions, but the advantage 212 may not be sufficiently appealing to the user 110 to prompt acceptance of the alternative driving behavior 210. Instead, the device 202 may offer to the user 110 an incentive in exchange for reduced speed (e.g., credit for free passage through interstate tolls), and may confer the incentive to the user 110 upon detecting an acceptance of the driving suggestion 216. Additionally, the magnitude of the alternative driving behavior incentive may be selected proportional to a magnitude of the advantage 212 of the alternative driving behavior (e.g., offering a larger credit for reductions in speed that provide a larger reduction of emissions). These and other variations in the presentation of driving suggestions 216 may be included in embodiments of the techniques presented herein.

E. Computing Environment

Figure 9:
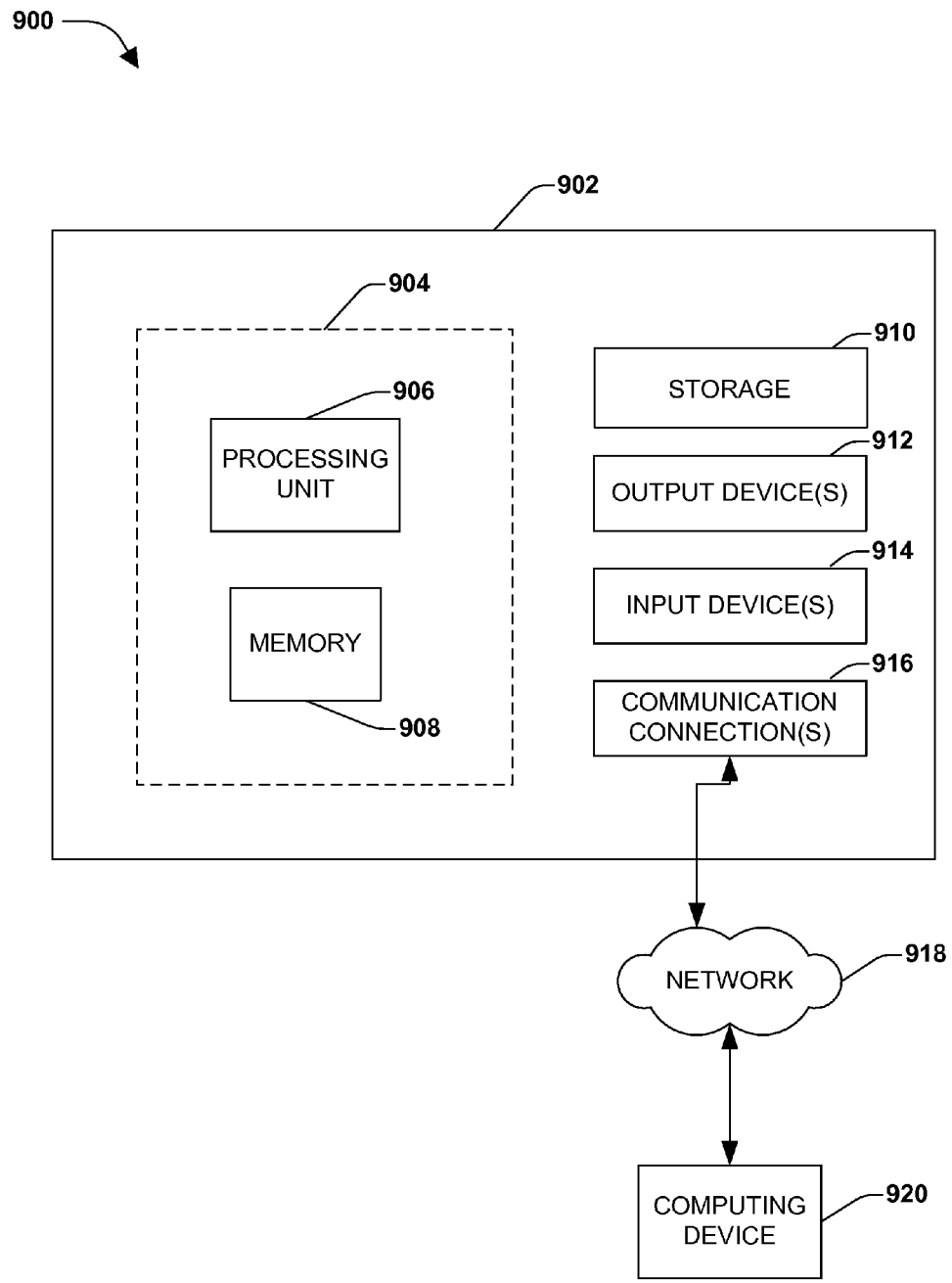
FIG. 9 illustrates an exemplary computing environment wherein one or more of the provisions set forth herein may be implemented.

FIG. 9 and the following discussion provide a brief, general description of a suitable computing environment to implement embodiments of one or more of the provisions set forth herein. The operating environment of FIG. 9 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 9 illustrates an example of a system 900 comprising a computing device 902 configured to implement one or more embodiments provided herein. In one configuration, computing device 902 includes at least one processing unit 906 and memory 908. Depending on the exact configuration and type of computing device, memory 908 may be volatile (such as RAM, for example), non-volatile (such as ROM, flash memory, etc., for example) or some combination of the two. This configuration is illustrated in FIG. 9 by dashed line 904.

In other embodiments, device 902 may include additional features and/or functionality. For example, device 902 may also include additional storage (e.g., removable and/or non-removable) including, but not limited to, magnetic storage, optical storage, and the like. Such additional storage is illustrated in FIG. 9 by storage 910. In one embodiment, computer readable instructions to implement one or more embodiments provided herein may be in storage 910. Storage 910 may also store other computer readable instructions to implement an operating system, an application program, and the like. Computer readable instructions may be loaded in memory 908 for execution by processing unit 906, for example.

The term "computer readable media" as used herein includes computer storage media. Computer storage media includes volatile and nonvolatile, removable and non-removable media implemented in any method or technology for storage of information such as computer readable instructions or other data. Memory 908 and storage 910 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 902. Any such computer storage media may be part of device 902.

Device 902 may also include communication connection(s) 916 that allows device 902 to communicate with other devices. Communication connection(s) 916 may include, but is not limited to, a modem, a Network Interface Card (NIC), an integrated network interface, a radio frequency transmitter/receiver, an infrared port, a USB connection, or other interfaces for connecting computing device 902 to other computing devices. Communication connection(s) 916 may include a wired connection or a wireless connection. Communication connection(s) 916 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 902 may include input device(s) 914 such as keyboard, mouse, pen, voice input device, touch input device, infrared cameras, video input devices, and/or any other input device. Output device(s) 912 such as one or more displays, speakers, printers, and/or any other output device may also be included in device 902. Input device(s) 914 and output device(s) 912 may be connected to device 902 via a wired connection, wireless connection, or any combination thereof. In one embodiment, an input device or an output device from another computing device may be used as input device(s) 914 or output device(s) 912 for computing device 902.

Components of computing device 902 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 902 may be interconnected by a network. For example, memory 908 may be comprised of multiple physical memory units located in different physical locations interconnected by a network.

Those skilled in the art will realize that storage devices utilized to store computer readable instructions may be distributed across a network. For example, a computing device 920 accessible via network 918 may store computer readable instructions to implement one or more embodiments provided herein. Computing device 902 may access computing device 920 and download a part or all of the computer readable instructions for execution. Alternatively, computing device 902 may download pieces of the computer readable instructions, as needed, or some instructions may be executed at computing device 902 and some at computing device 920.

F. Usage of Terms

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method of facilitating a user driving a vehicle, the method involving a device having a processor and comprising:
    executing on the processor instructions configured to:
        at a first time point associated with a first instance of a driving context, monitor a vehicle control input of the vehicle by the user to identify a user driving behavior of the user in the driving context;
        identify at least one alternative driving behavior providing an advantage over the user driving behavior of the user for operating the vehicle in the driving context;
        identify a suggestion location that is associated with at least one alternate driving behavior; and
        at a second time point that is associated with a second instance of the driving context and at the suggestion location, present to the user a driving suggestion of the alternative driving behavior in the driving context.

2. The method of claim 1, the user driving behavior selected from a user driving behavior set comprising:
    a lane selection among at least two lanes of a causeway;
    a vehicle speed in the driving context;
    a vehicle acceleration in the driving context;
    a vehicle turning rate in the driving context;
    a vehicle gear selection in the driving context;
    a vehicle signaling input in the driving context; and
    a vehicle climate control in the driving context.

3. The method of claim 1, the advantage selected from an advantage set comprising:
    a fuel economy promoting advantage;
    an emissions reducing advantage;
    a vehicle maintenance promoting advantage;
    a travel time reducing advantage;
    a driving safety promoting advantage;
    a causeway hazard avoiding advantage; and
    a smooth driving experience promoting advantage.

4. The method of claim 1, identifying the alternative driving behavior comprising:
    sending the vehicle control input of the vehicle by the user to a driving behavior evaluating service; and
    receiving from the driving behavior evaluating service at least one alternative driving behavior providing an advantage over the user driving behavior of the user for operating the vehicle in the driving context.

5. The method of claim 1:
    the instructions further configured to, from an advantage set, receive from the user at least one selected advantage; and
    identifying the alternative driving behavior further comprising: identify at least one alternative driving behavior providing a selected advantage over the user driving behavior of the user for operating the vehicle in the driving context.

6. The method of claim 1, presenting the driving suggestion further comprising: presenting suggestions to the user not exceeding a suggestion count threshold within a suggestion time period.

7. The method of claim 1, presenting the driving suggestion further comprising: presenting the driving suggestion to the user only if a comparative advantage exceeds a comparative advantage threshold.

8. The method of claim 1:
    the user driving behavior associated with a first advantage;
    the alternative driving behavior associated with a second advantage; and
    the instructions further configured to compare the first advantage and the second advantage of the alternative driving behavior to identify a comparative advantage; and
    presenting the driving suggestion further comprising: presenting the driving suggestion to the user only for a positive comparative advantage.

9. The method of claim 1:
    the vehicle comprising a window through which the user views a driving region of the vehicle through a window; and
    presenting the driving suggestion to the user further comprising: displaying the driving suggestion on the window.

10. The method of claim 9:
    the driving suggestion relating to an object viewable through the window; and
    displaying the driving suggestion on the window further comprising: positioning the driving suggestion on the window to visually indicate the object related to the driving suggestion.

11. The method of claim 1, presenting the driving suggestion to the user comprising: presenting to the user the driving suggestion and an explanation of the advantage of the alternative driving behavior over the user driving behavior of the user.

12. The method of claim 1, the instructions further configured to, upon receiving from the user an acceptance of the driving suggestion, control the vehicle to implement the driving suggestion.

13. The method of claim 1:
    presenting the alternative driving behavior further comprising: presenting to the user with the driving suggestion an alternative driving behavior incentive; and
    the instructions further configured to, upon detecting an acceptance of the driving suggestion by the user, confer the alternative driving behavior incentive to the user.

14. The method of claim 13, the instructions further configured to select the alternative driving behavior incentive proportional to a magnitude of the advantage of the alternative driving behavior.

15. The method of claim 1, the instructions further configured to, upon detecting a declinement by the user of the driving suggestion in the driving context, refrain from subsequently presenting the driving suggestion to the user in the driving context.

16. A system for facilitating a user driving a vehicle, the system involving a device having a processor and comprising:
    a suggestion identifying component comprising instructions that, when executed on the processor, cause the device to:
        monitor a vehicle control input of the vehicle by the user to identify, at a first time point, a user driving behavior of the user in a driving context; and identify at least one alternative driving behavior providing an advantage over the user driving behavior of the user for operating the vehicle in the driving context; and identify a suggestion location that is associated with the at least one alternate driving behavior; and a suggestion presenting component comprising instructions that, when executed on the processor, cause the device to present to the user, at a second time point that is associated with an impending second instance of the driving context and when the user is at the suggestion location, a driving suggestion of the alternative driving behavior in the driving context.

17. A method of facilitating users driving vehicles, the method involving a device having a processor and comprising:

executing on the processor instructions configured to:

at a first time point associated with a first instance of a driving context, receive from respective vehicles at least one vehicle control input of the vehicle to identify a user driving behavior of the user in the driving context;

identify, for respective driving contexts, at least one alternative driving behavior providing an advantage for vehicles operating in the driving context;

identify a suggestion location that is associated with at least one alternate driving behavior; and at a second time point that is associated with an impending second instance of the driving context, instruct at least one vehicle operated by a user in the driving context and located at the suggestion location, of a user driving behavior that is less advantageous than the alternative driving behavior to present to the user a driving suggestion of the alternative driving behavior.

18. The method of claim 17, identifying the alternative driving behavior for a driving context comprising:

for respective vehicles, evaluating the vehicle control input received from the vehicle to determine vehicle result in the driving context;

among the vehicle results in the driving context, identify an advantage of the alternative driving behavior relative to the vehicle control input; and identifying an alternative driving behavior associated with the advantage.

19. The system of claim 16, wherein the suggestion presenting component presents to the user, with the driving suggestion, an explanation of the advantage of the alternative driving behavior over the user driving behavior of the user.

20. The method of claim 17, wherein:

presenting the alternative driving behavior further comprises: presenting to the user with the driving suggestion an alternative driving behavior incentive; and the instructions are further configured to, upon detecting an acceptance of the driving suggestion by the user, confer the alternative driving behavior incentive to the user.

* * * * *